United States Patent
Terada et al.

(10) Patent No.: US 9,343,752 B2
(45) Date of Patent: May 17, 2016

(54) FUEL CELL STACK

(71) Applicant: HONDA MOTOR CO., LTD., Tokyo (JP)

(72) Inventors: Eri Terada, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 14/183,523

(22) Filed: Feb. 19, 2014

(65) Prior Publication Data

US 2014/0234747 A1 Aug. 21, 2014

(30) Foreign Application Priority Data

Feb. 20, 2013 (JP) ................. 2013-031400

(51) Int. Cl.
*H01M 8/02* (2016.01)
*H01M 8/24* (2016.01)

(52) U.S. Cl.
CPC .......... *H01M 8/0254* (2013.01); *H01M 8/0276* (2013.01); *H01M 8/242* (2013.01); *H01M 8/2465* (2013.01); *H01M 8/0273* (2013.01); *H01M 8/2485* (2013.01); *Y02E 60/50* (2013.01)

(58) Field of Classification Search
CPC ............ H01M 8/0273; H01M 8/0276; H01M 8/2465; H01M 8/2485
See application file for complete search history.

(56) References Cited

U.S. PATENT DOCUMENTS

| | | | |
|---|---|---|---|
| 7,767,355 B2 | 8/2010 | Kato et al. | |
| 7,799,480 B2 | 9/2010 | Nishiyama et al. | |
| 8,574,778 B2 | 11/2013 | Jinba et al. | |
| 2006/0110650 A1* | 5/2006 | Sugiura et al. | 429/38 |
| 2010/0068599 A1 | 3/2010 | Furusawa et al. | |
| 2012/0295177 A1* | 11/2012 | Ishida et al. | 429/434 |

FOREIGN PATENT DOCUMENTS

JP 4727972 B2 6/2006

\* cited by examiner

*Primary Examiner* — Jeremiah Smith
(74) *Attorney, Agent, or Firm* — Mori & Ward, LLP

(57) ABSTRACT

A fuel cell stack includes a stacked body which includes separators and a membrane electrode assembly. A first terminal plate, a first insulator, and a first end plate are disposed at a first end of the stacked body. A second terminal plate, a second insulator, and a second end plate are disposed at a second end of the stacked body. Each of the first terminal plate and the second terminal plate is provided in a first recessed portion formed in each of the first insulator and the second insulator. Each of the first and second insulators includes an outer peripheral part and a protrusion and recess portion in the outer peripheral part which is in contact with each of the separators that is disposed at the first and second ends. The protrusion and recess portion has a shape corresponding to a protrusion and recess shape of the separator.

13 Claims, 16 Drawing Sheets

FUEL CELL STACK

CROSS-REFERENCE TO RELATED APPLICATIONS

The present application claims priority under 35 U.S.C. §119 to Japanese Patent Application No. 2013-031400, filed Feb. 20, 2013, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA) and a pair of separators sandwiching the MEA therebetween. The MEA includes an electrolyte membrane, which is made from a solid polymer ion-exchange membrane, an anode electrode disposed on one side of the electrolyte membrane, and a cathode electrode disposed on the other side of the electrolyte membrane. Usually, fuel cells are stacked so as to form a fuel cell stack. For example, the fuel cell stack is mounted on a fuel-cell electric vehicle and used as an automobile fuel cell system.

A fuel cell stack includes a stacked body in which a plurality of fuel cells are stacked; and a terminal plate, an insulator, and an end plate that are stacked at each end of the stacked body in the stacking direction. For example, Japanese Patent No. 4727972 describes a fuel cell stack in which a dummy cell is disposed on at least one end portion of a stacked body in the stacking direction. The dummy cell is disposed between the stacked body and a terminal plate so as to correspond to a fuel cell. The dummy cell includes a metal plate instead of an electrolyte membrane and does not generate water because the dummy cell does not generate electric power. Therefore, the dummy cell functions as a heat insulating layer.

SUMMARY

According to one aspect of the present invention, a fuel cell stack includes a stacked body, a first terminal plate, a first insulator, a first end plate, a second terminal plate, a second insulator, and a second end plate. The stacked body includes a plurality of separators and a membrane electrode assembly which are stacked in a stacking direction. The membrane electrode assembly includes an electrolyte membrane and a pair of electrodes sandwiching the electrolyte membrane therebetween. The stacked body has a first end and a second end opposite to the first end in the stacking direction. The first terminal plate, the first insulator, and the first end plate are disposed at the first end of the stacked body. The second terminal plate, the second insulator, and the second end plate are disposed at the second end of the stacked body. Each of the first terminal plate and the second terminal plate is provided in a first recessed portion formed in each of the first insulator and the second insulator. Each of the first insulator and the second insulator includes an outer peripheral part and a protrusion and recess portion in the outer peripheral part which is in contact with each of the separators that is disposed at the first end and the second end of the stacked body. The protrusion and recess portion has a shape corresponding to a protrusion and recess shape of the separator.

According to another aspect of the present invention, a fuel cell stack includes a stacked body, a terminal plate, an insulator, and an end plate. The stacked body includes a plurality of separators and a membrane electrode assembly which are stacked in a stacking direction. The membrane electrode assembly includes an electrolyte membrane and a pair of electrodes sandwiching the electrolyte membrane therebetween. The stacked body has an end in the stacking direction. The terminal plate, the insulator, and the end plate are disposed at the end of the stacked body. The terminal plate is provided in a recessed portion formed in the insulator. The insulator includes an outer peripheral part and a protrusion and recess portion in the outer peripheral part which is in contact with one of the separators that is disposed at the end of the stacked body. The protrusion and recess portion has a shape corresponding to a protrusion and recess shape of the one of the separators.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
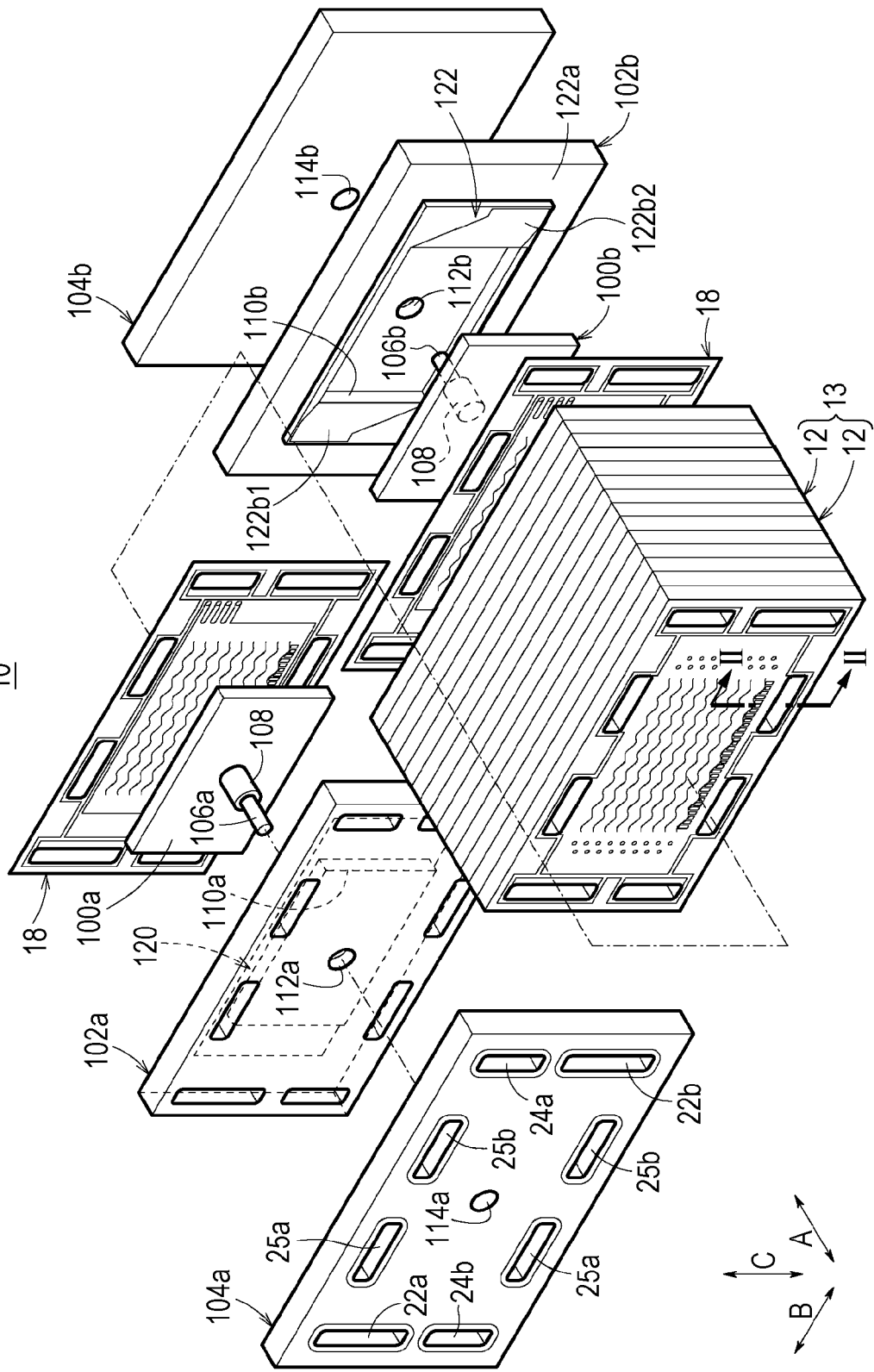
FIG. 1 is a partially exploded schematic perspective view of a fuel cell stack according to a first embodiment of the present disclosure.

The embodiments will now be described with reference to the accompanying drawings, wherein like reference numerals designate corresponding or identical elements throughout the various drawings.

Figure 2:
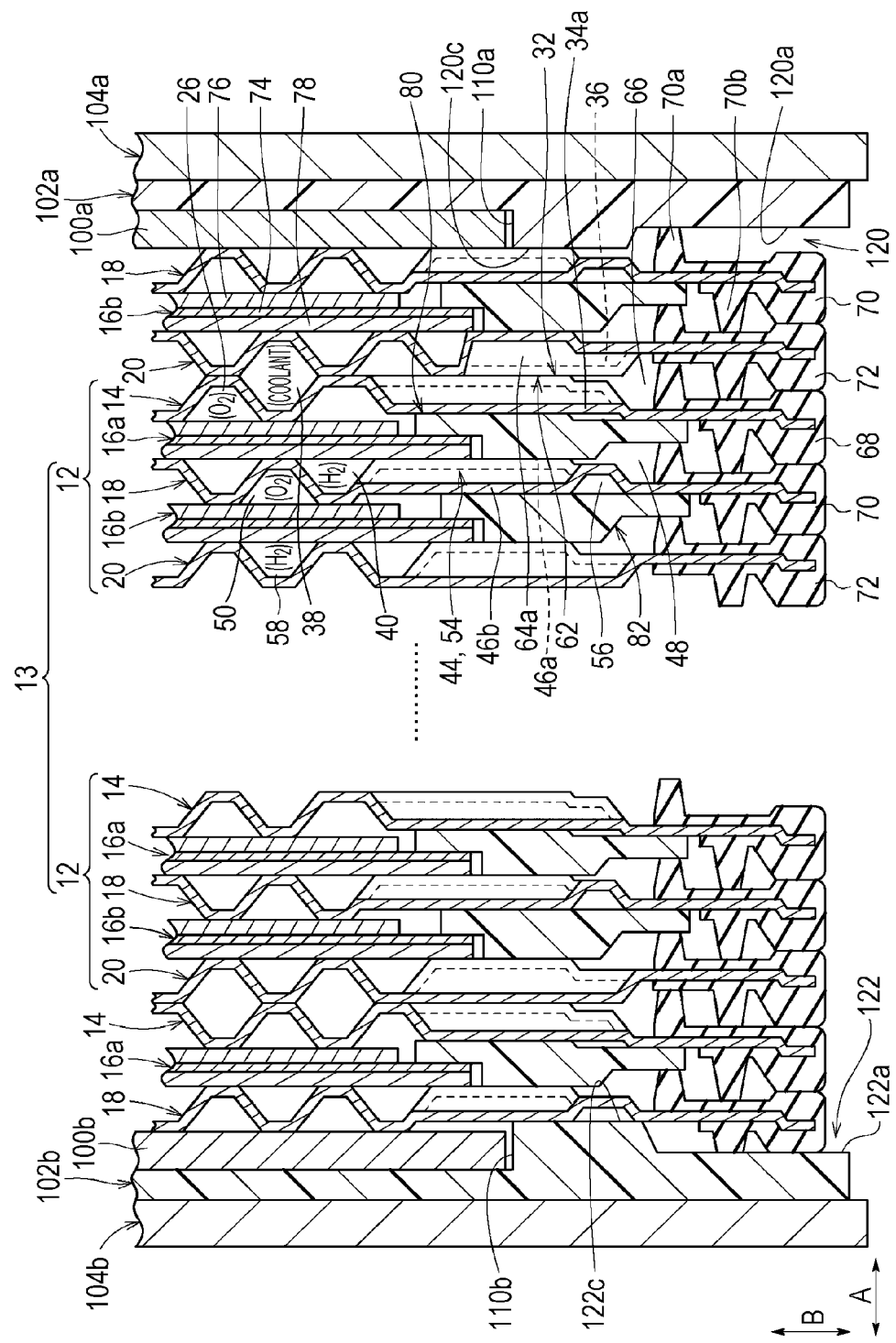
FIG. 2 is a sectional view of the fuel cell stack taken along line II-II of FIG. 1.

As illustrated in FIGS. 1 and 2, a fuel cell stack 10 according to a first embodiment of the present disclosure includes a stacked body 13 in which a plurality of power generation units 12 in upright positions are stacked in a horizontal direction (direction of arrow A).

As illustrated in FIG. 1, at one end of the stacked body 13 in the stacking direction (direction of arrow A), a terminal plate 100a, an insulator (insulation plate) 102a, and an end plate 104a are stacked outward in this order. At the other end of the stacked body 13 in the stacking direction, a terminal plate 100b, an insulator (insulation plate) 102b, and an end plate 104b are stacked outward in this order.

For example, the fuel cell stack 10 is integrally held in a box casing (not shown) having the end plates 104a and 104b, which are rectangular, as its end located plates. Alternatively, the fuel cell stack 10 is integrally fastened by using a plurality of tie rods (not shown) extending in the direction of arrow A.

As illustrated in FIGS. 2 to 5, each of the power generation units 12 includes a first metal separator 14, a first membrane electrode assembly 16a, a second metal separator 18, a second membrane electrode assembly 16b, and a third metal separator 20. The first metal separator 14, the first membrane electrode assembly 16a, the second metal separator 18, the second membrane electrode assembly 16b, and the third metal separator 20 are stacked in a horizontal direction. Electrode surfaces of the first and second membrane electrode assemblies 16a and 16b extend vertically and have horizontally-elongated shapes.

The first metal separator 14, the second metal separator 18, and the third metal separator 20 are each made from a horizontally-elongated metal plate, such as a steel plate, a stainless steel plate, an aluminum plate, a galvanized steel plate, or any of such thin metal plates having an anti-corrosive coating on the surface thereof. The first metal separator 14, the second metal separator 18, and the third metal separator 20, which have rectangular shapes in plan view, are formed by press-forming thin metal plates so as to have corrugated cross-sectional shapes. Instead of the metal separators, carbon separators may be used.

Figure 3:
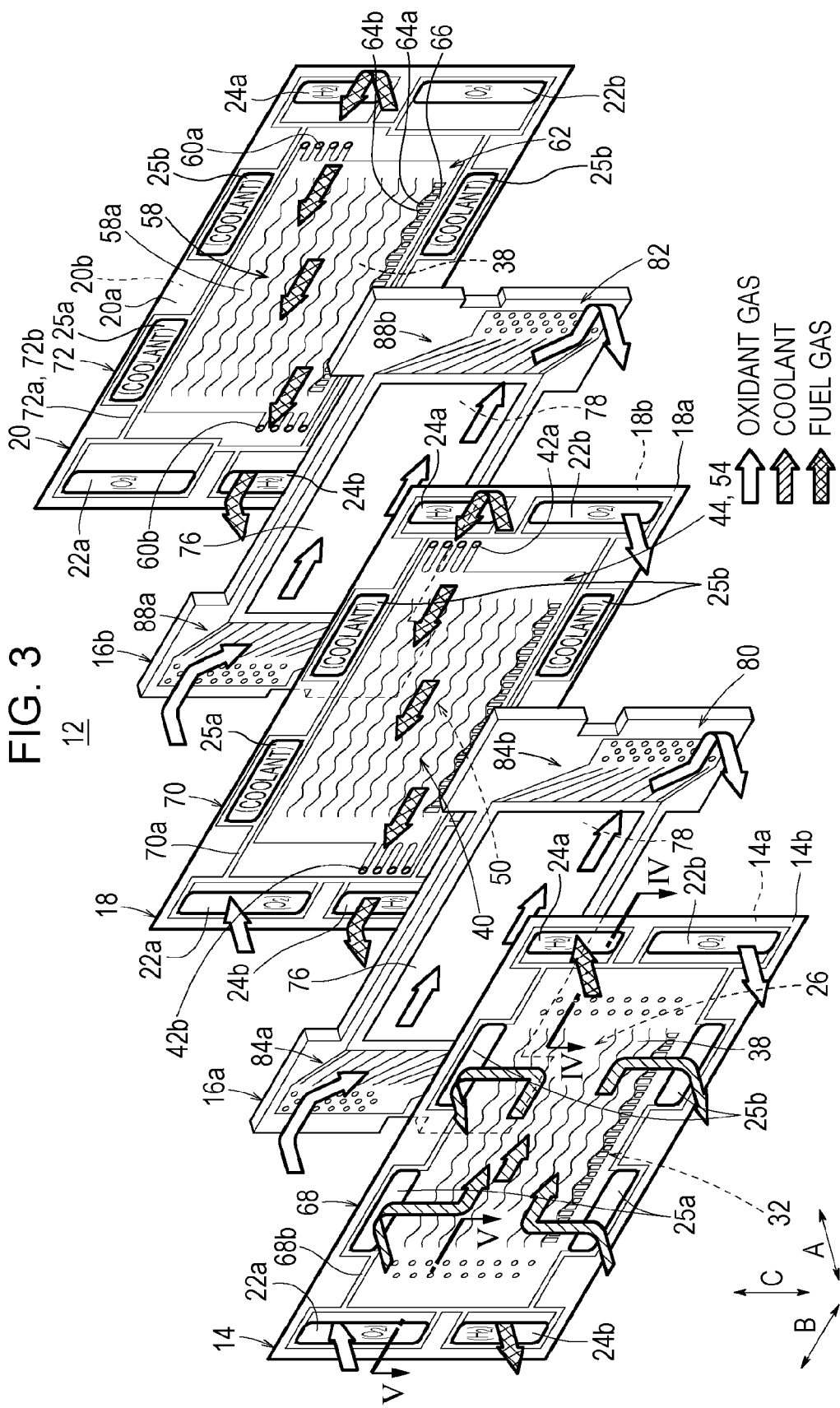
FIG. 3 is a partial exploded perspective view of a power generation unit of the fuel cell stack.

As illustrated in FIG. 3, an oxidant gas inlet manifold 22a and a fuel gas outlet manifold 24b are formed in the power generation unit 12 so as to extend in the direction of arrow A at one end portion of the power generation unit 12 in the longitudinal direction (direction of arrow B), that is, one end portion of each of the first metal separator 14, the second metal separator 18, and the third metal separator 20 in the longitudinal direction. An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a and an oxidant gas outlet manifold 22b are formed in the power generation unit 12 so as to extend in the direction of arrow A at the other end portion of the power generation unit 12 in the longitudinal direction (direction of arrow B). The fuel gas is supplied through the fuel gas inlet manifold 24a. The oxidant gas is discharged through the oxidant gas outlet manifold 22b.

A pair of coolant inlet manifolds 25a are formed in the power generation unit 12 so as to extend in the direction of arrow A at end portions of the power generation unit 12 in the transversal direction (direction of arrow C) near the oxidant gas inlet manifold 22a. A coolant is supplied through the pair of coolant inlet manifolds 25a. A pair of coolant outlet manifolds 25b are formed in the power generation unit 12 so as to extend in the direction of arrow A at end portions of the power generation unit 12 in the transversal direction near the fuel gas inlet manifold 24a. The coolant is discharged through the pair of coolant outlet manifolds 25b.

Figure 6:
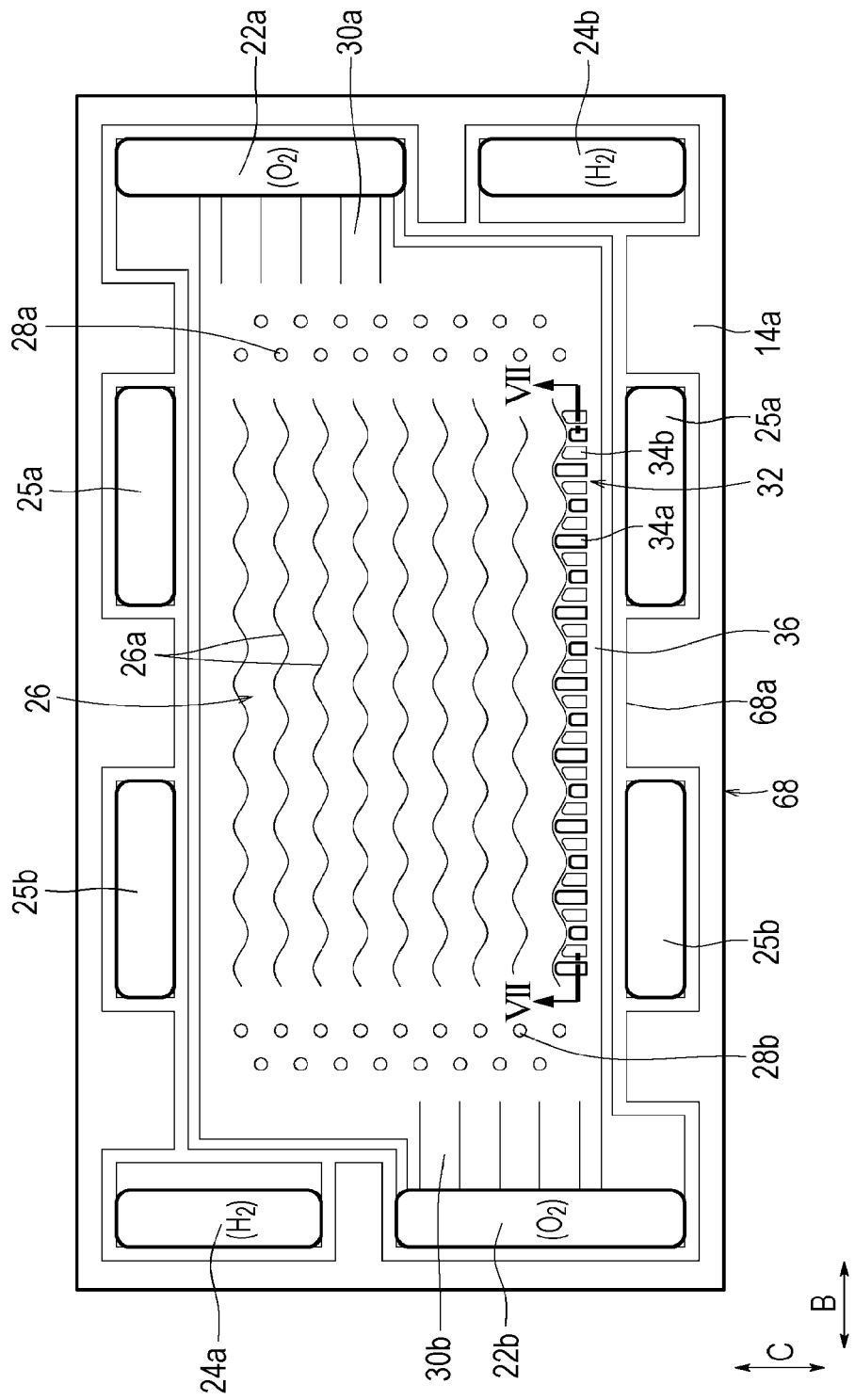
FIG. 6 is a plan view of a first metal separator of the power generation unit.

As illustrated in FIG. 6, a first oxidant gas channel 26, through which the oxidant gas inlet manifold 22a is connected to the oxidant gas outlet manifold 22b, is formed on a surface 14a of the first metal separator 14 facing the first membrane electrode assembly 16a.

The first oxidant gas channel 26 includes a plurality of wave-shaped channel grooves (or linear channel grooves) 26a extending in the direction of arrow B. An inlet embossed portion 28a and an outlet embossed portion 28b, each having a plurality of protrusions, are respectively disposed near an inlet and outlet of the first oxidant gas channel 26.

A plurality of inlet connection grooves 30a, which constitute a bridge portion, are formed between the inlet embossed portion 28a and the oxidant gas inlet manifold 22a. A plurality of outlet connection grooves 30b, which constitute a bridge portion, are formed between the outlet embossed portion 28b and the oxidant gas outlet manifold 22b.

A first cathode drain passage 32 is disposed at a lower end of the first oxidant gas channel 26 in the vertical direction. Generated water is drained from the first oxidant gas channel 26 through the first cathode drain passage 32 vertically downward (in the direction of gravity). The first cathode drain passage 32 includes convex 34a and concave 34b, which are alternately formed on the surface 14a and a surface 14b of the first metal separator 14. The surface 14b is on the opposite side to the surface 14a. The convex 34a and concave 34b are formed on the first metal separator 14 by press-forming. Alternatively, the convex 34a and concave 34b may be disposed at an upper end of the first oxidant gas channel 26 in the vertical direction. In particular, flow of the coolant can be prevented from short-cutting by disposing the convex 34a and concave 34b at upper and lower ends of a coolant channel. The same shall apply hereinafter.

Figure 7:
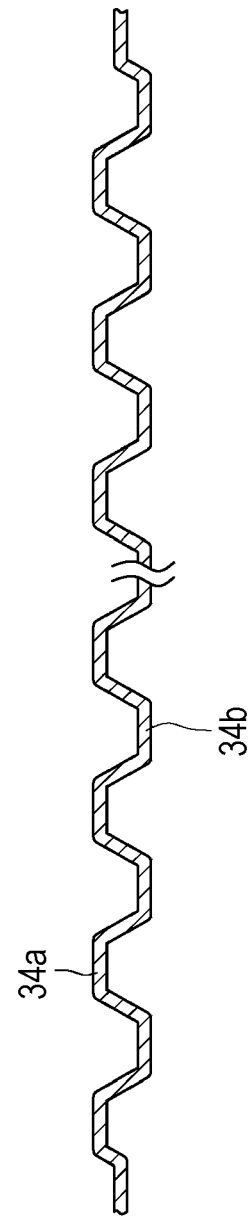
FIG. 7 is a sectional view of the first metal separator taken along line VII-VII of FIG.

The convex 34a each have a shape protruding from the surface 14a (a shape recessed in the surface 14b), and the concave 34b each have a shape protruding from the surface 14b (a shape recessed in the surface 14a) (see FIG. 7). The lengths (the dimensions in the direction of arrow C) of the convex 34a and concave 34b periodically change in accordance with the shape of the wave-shaped channel grooves 26a.

As illustrated in FIG. 2, the convex 34a partially block the first cathode drain passage 32 by contacting a first resin frame member 80 (described below). As illustrated in FIG. 6, a drain channel 36, which extends in the direction of arrow B, is disposed below the first cathode drain passage 32. The drain channel 36 is connected to the oxidant gas outlet manifold 22b.

As illustrated in FIG. 3, a coolant channel 38, through which the coolant inlet manifolds 25a are connected to the coolant outlet manifolds 25b, is formed on the surface 14b of the first metal separator 14. The coolant channel 38 is formed between the back side of the first oxidant gas channel 26 and the back side of a second fuel gas channel 58 (described below).

Figure 8:
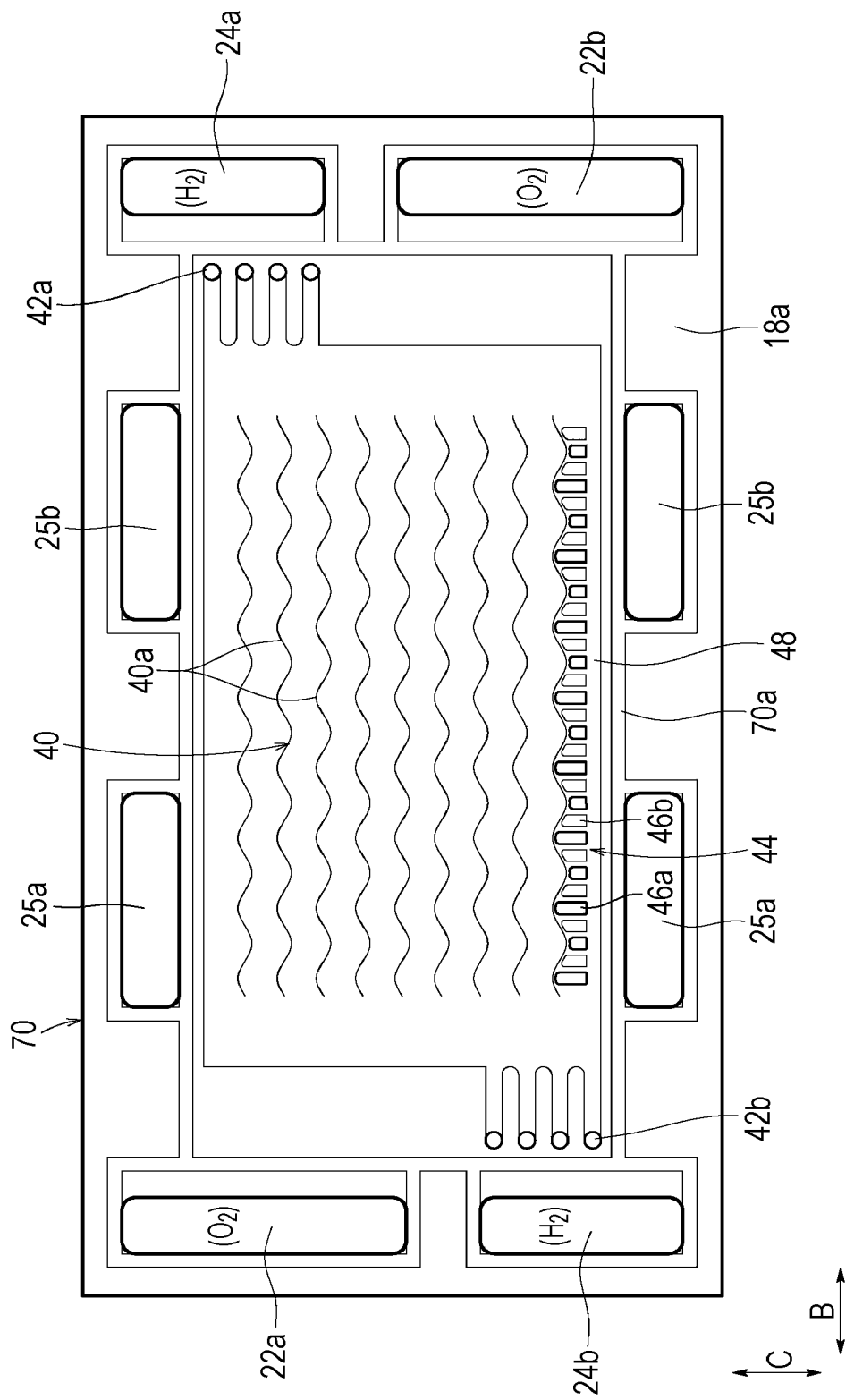
FIG. 8 is a plan view showing one surface of a second metal separator of the power generation unit.

As illustrated in FIG. 8, a first fuel gas channel 40, through which the fuel gas inlet manifold 24a is connected to the fuel gas outlet manifold 24b, is formed on a surface 18a of the second metal separator 18 facing the first membrane electrode assembly 16a. The first fuel gas channel 40 includes a plurality of wave-shaped channel grooves (or linear channel grooves) 40a extending in the direction of arrow B. A plurality of supply holes 42a are formed near the fuel gas inlet manifold 24a. A plurality of discharge holes 42b are formed near the fuel gas outlet manifold 24b.

A first anode drain passage 44 is disposed at a lower end of the first fuel gas channel 40 in the vertical direction. Generated water (back-diffusion water) is drained from the first fuel gas channel 40 through the first anode drain passage 44 vertically downward (in the direction of gravity). The first anode drain passage 44 includes convex 46a and concave 46b, which are alternately formed on the surface 18a and a surface 18b of the second metal separator 18. The surface 18b is on the opposite side to the surface 18a.

As illustrated in FIG. 2, the convex 46a partially block the first anode drain passage 44 by contacting an anode electrode 78 (described below) of the first membrane electrode assembly 16a. As illustrated in FIG. 8, a drain channel 48, which extends in the direction of arrow B, is disposed below the first anode drain passage 44. The drain channel 48 is connected to the discharge holes 42b.

Figure 9:
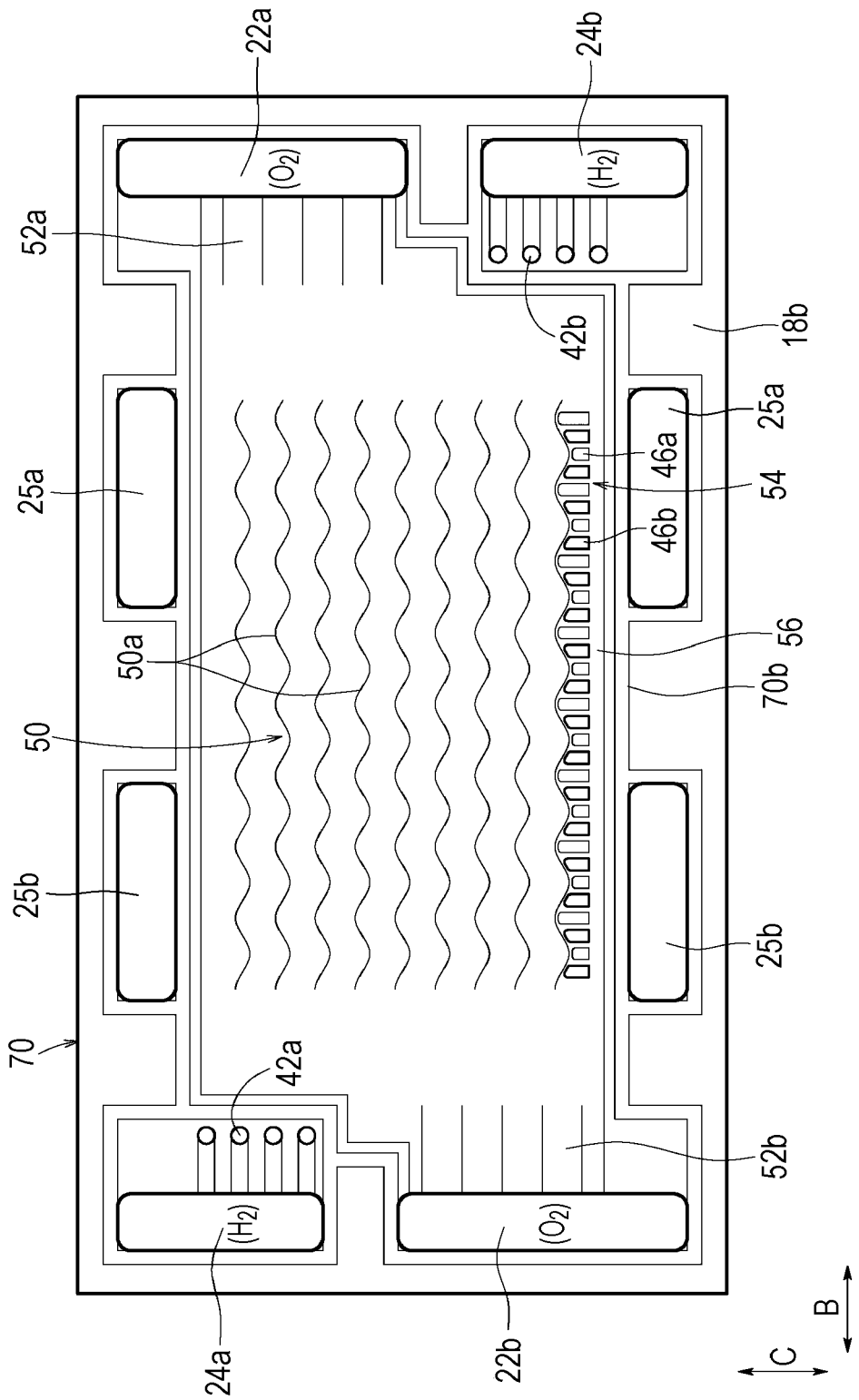
FIG. 9 is a plan view showing the other surface of the second metal separator.

As illustrated in FIG. 9, a second oxidant gas channel 50, through which the oxidant gas inlet manifold 22a is connected to the oxidant gas outlet manifold 22b, is formed on the surface 18b of the second metal separator 18 facing the second membrane electrode assembly 16b. The second oxidant gas channel 50 includes a plurality of wave-shaped channel grooves (or linear channel grooves) 50a extending in the direction of arrow B. A plurality of inlet connection grooves 52a are formed near the oxidant gas inlet manifold 22a. A plurality of outlet connection grooves 52b are formed near the oxidant gas outlet manifold 22b.

A second cathode drain passage 54 is disposed at a lower end of the second oxidant gas channel 50 in the vertical direction. Generated water is drained from the second oxidant gas channel 50 through the second cathode drain passage 54 vertically downward (in the direction of gravity). The second cathode drain passage 54 includes the convex 46a and concave 46b, which are formed on the back side of the first anode drain passage 44. As illustrated in FIG. 2, the back side of the concave 46b partially blocks the second cathode drain passage 54 by contacting a second resin frame member 82 (described below). As illustrated in FIG. 9, a drain channel 56, which extends in the direction of arrow B, is disposed below the second cathode drain passage 54. The drain channel 56 is connected to the oxidant gas outlet manifold 22b.

As illustrated in FIG. 3, the second fuel gas channel 58, through which the fuel gas inlet manifold 24a is connected to the fuel gas outlet manifold 24b, is formed on a surface 20a of the third metal separator 20 facing the second membrane electrode assembly 16b. The second fuel gas channel 58 includes a plurality of wave-shaped channel grooves (or linear channel grooves) 58a extending in the direction of arrow B.

Figure 4:
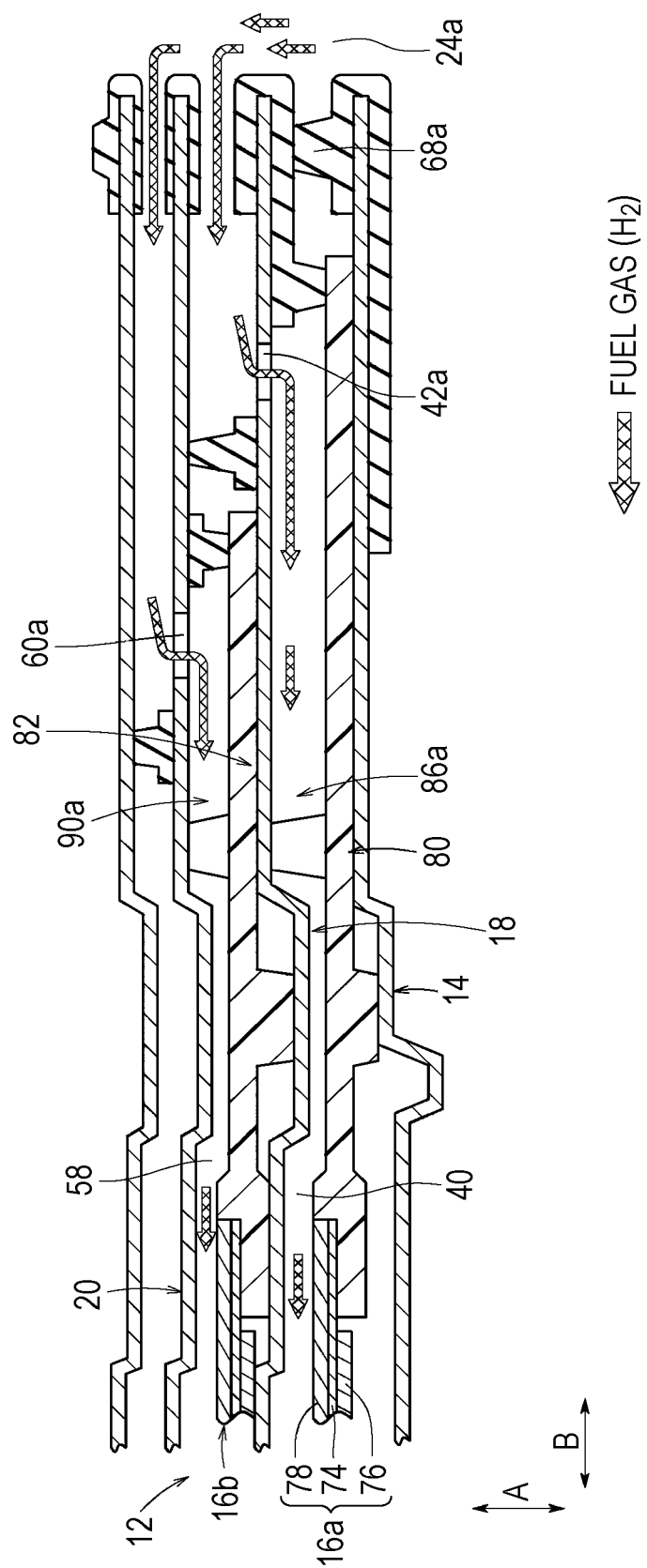
FIG. 4 is a sectional view of the power generation unit taken along line IV-IV of FIG. 3.

A plurality of supply holes 60a are formed near the fuel gas inlet manifold 24a. A plurality of discharge holes 60b are formed near the fuel gas outlet manifold 24b. As illustrated in FIGS. 3 and 4, the supply holes 60a are disposed inward from the supply holes 42a of the second metal separator 18 (nearer to the fuel gas channel). The discharge holes 60b are disposed inward from the discharge holes 42b of the second metal separator 18 (nearer to the fuel gas channel).

As illustrated in FIG. 3, a second anode drain passage 62 is disposed at a lower end of the second fuel gas channel 58 in the vertical direction. Generated water (back-diffusion water) is drained from the second fuel gas channel 58 through the second anode drain passage 62 vertically downward (in the direction of gravity). The second anode drain passage 62 includes convex 64a and concave 64b, which are alternately formed on the surface 20a and a surface 20b of the third metal separator 20. The surface 20b is on the opposite side to the surface 20a.

As illustrated in FIG. 2, the convex 64a partially block the second anode drain passage 62 by contacting the anode electrode 78 (described below) of the second membrane electrode assembly 16b. As illustrated in FIG. 3, a drain channel 66, which extends in the direction of arrow B, is disposed below the second anode drain passage 62. The drain channel 66 is connected to the discharge holes 60b.

A part of the coolant channel 38 is formed on the surface 20b of the third metal separator 20 on the back side of the second fuel gas channel 58. The coolant channel 38 is integrally formed between the surface 20b of the third metal separator 20 and the surface 14b of the first metal separator 14 that is disposed adjacent to the third metal separator 20. The convex 64a and concave 64b, which are formed on the back side of the second anode drain passage 62, are disposed at a lower end of the coolant channel 38 in the vertical direction.

A first sealing member 68 is integrally formed on the surfaces 14a and 14b of the first metal separator 14 so as to surround the outer periphery of the first metal separator 14. A second sealing member 70 is integrally formed on the surfaces 18a and 18b of the second metal separator 18 so as to surround the outer periphery of the second metal separator 18. A third sealing member 72 is integrally formed on the surfaces 20a and 20b of the third metal separator 20 so as to surround the outer periphery of the third metal separator 20.

Each of the first sealing member 68, the second sealing member 70, and the third sealing member 72 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIG. 6, the first sealing member 68 includes a first protruding sealing portion 68a on the surface 14a of the first metal separator 14. The first protruding sealing portion 68a connects the outer peripheries of the oxidant gas inlet manifold 22a, the oxidant gas outlet manifold 22b, and the first oxidant gas channel 26. As illustrated in FIG. 3, the first sealing member 68 includes a second protruding sealing portion 68b on the surface 14b of the first metal separator 14. The second protruding sealing portion 68b connects the outer peripheries of the coolant inlet manifolds 25a, the coolant outlet manifolds 25b, and the coolant channel 38.

As illustrated in FIG. 8, the second sealing member 70 includes a first protruding sealing portion 70a on the surface 18a of the second metal separator 18. The first protruding sealing portion 70a surrounds the supply holes 42a, the discharge holes 42b, and the first fuel gas channel 40 so that they are connected to each other.

As illustrated in FIG. 9, the second sealing member 70 includes a second protruding sealing portion 70b on the surface 18b of the second metal separator 18. The second protruding sealing portion 70b connects the outer peripheries of the oxidant gas inlet manifold 22a, the oxidant gas outlet manifold 22b, and the second oxidant gas channel 50.

As illustrated in FIG. 3, the third sealing member 72 includes a first protruding sealing portion 72a on the surface 20a of the third metal separator 20. The first protruding sealing portion 72a surrounds the supply holes 60a, the discharge holes 60b, and the second fuel gas channel 58 so that they are connected to each other.

The third sealing member 72 includes a second protruding sealing portion 72b on the surface 20b of the third metal separator 20. The second protruding sealing portion 72b connects the outer peripheries of the coolant inlet manifolds 25a, the coolant outlet manifolds 25b, and the coolant channel 38.

As illustrated in FIG. 2, the first membrane electrode assembly 16a and the second membrane electrode assembly 16b each include a solid polymer electrolyte membrane 74, and a cathode electrode 76 and the anode electrode 78 sandwiching the solid polymer electrolyte membrane 74 therebetween. The solid polymer electrolyte membrane 74 is, for example, a thin film made of a perfluorosulfonate polymer and that is impregnated with water. Each of the first and second membrane electrode assemblies 16a and 16b is a so-called stepped MEA, in which the cathode electrode 76 has planar dimensions smaller than those of the anode electrode 78 and the solid polymer electrolyte membrane 74. Alternatively, the cathode electrode 76, the anode electrode 78, and the solid polymer electrolyte membrane 74 may have the same planar dimensions. Further alternatively, the anode electrode 78 may have planar dimensions smaller than those of the cathode electrode 76 and the solid polymer electrolyte membrane 74.

The cathode electrode 76 and the anode electrode 78 each include a gas diffusion layer (not shown) and an electrode catalyst layer (not shown). The gas diffusion layer is made of carbon paper or the like. The electrode catalyst layer is formed on a surface of the gas diffusion layer by uniformly coating the surface with porous carbon particles whose surfaces support a platinum alloy. The electrode catalyst layers are disposed on both sides of the solid polymer electrolyte membrane 74.

The first membrane electrode assembly 16a includes the first resin frame member 80 that is disposed outward from an end of the cathode electrode 76 on the outer periphery of the solid polymer electrolyte membrane 74. The first resin frame member 80 is integrally formed by, for example, injection molding or the like. The second membrane electrode assembly 16b includes the second resin frame member 82 that is disposed outward from an end of the cathode electrode 76 on the outer periphery of the solid polymer electrolyte membrane 74. The second resin frame member 82 is integrally formed by, for example, injection molding or the like. The first resin frame member 80 and the second resin frame member 82 are each made of a resin material, such as a commodity plastic, an engineering plastic, or a super engineering plastic.

As illustrated in FIG. 3, on a surface of the first resin frame member 80 on the cathode electrode 76 side, an inlet buffer portion 84a is disposed between the oxidant gas inlet manifold 22a and the inlet of the first oxidant gas channel 26. An outlet buffer portion 84b is disposed between the oxidant gas outlet manifold 22b and the outlet of the first oxidant gas channel 26. The inlet buffer portion 84a and the outlet buffer portion 84b each include a plurality of protrusions and a plurality of linear channels. The same applies to other buffer portions described below.

Figure 10:
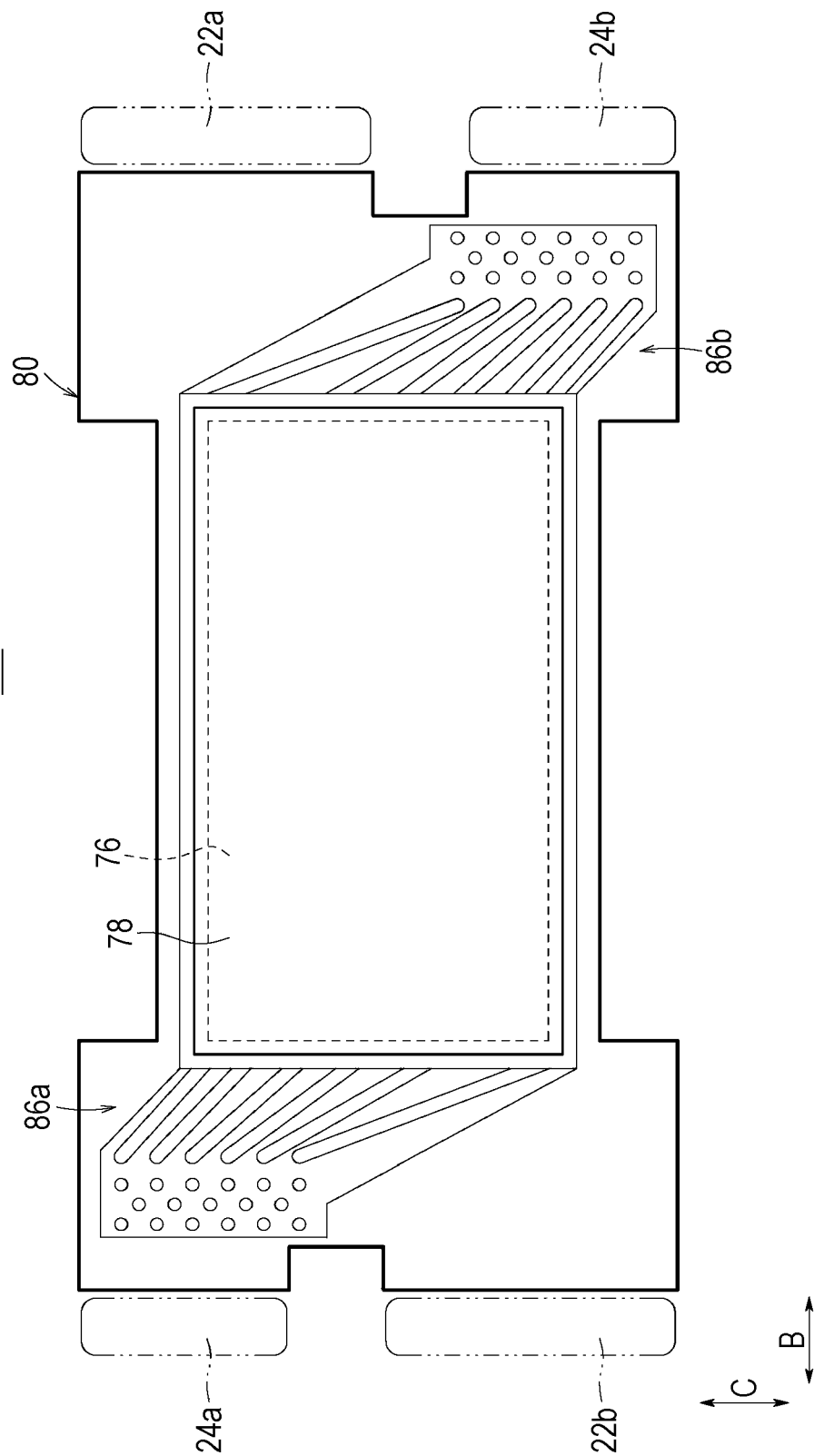
FIG. 10 is a plan view showing one surface of a first membrane electrode assembly of the power generation unit.

As illustrated in FIG. 10, on a surface of the first resin frame member 80 on the anode electrode 78 side, an inlet buffer portion 86a is disposed between the fuel gas inlet manifold 24a and the first fuel gas channel 40. An outlet buffer portion 86b is disposed between the fuel gas outlet manifold 24b and the first fuel gas channel 40.

As illustrated in FIG. 3, on a surface of the second resin frame member 82 of the second membrane electrode assembly 16b on the cathode electrode 76 side, an inlet buffer portion 88a is disposed between the oxidant gas inlet manifold 22a and the second oxidant gas channel 50. An outlet buffer portion 88b is disposed between the oxidant gas outlet manifold 22b and the second oxidant gas channel 50.

Figure 11:
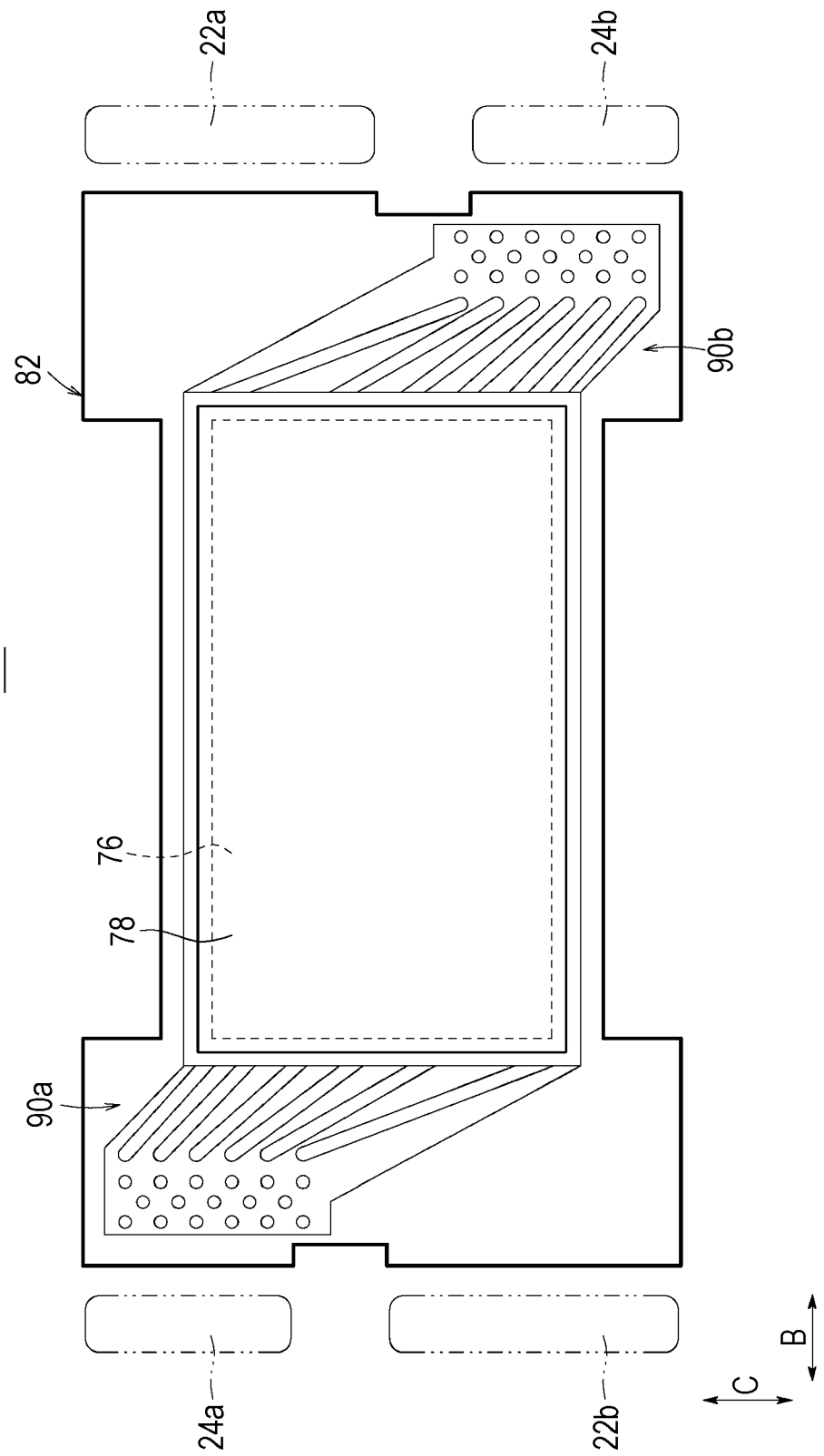
FIG. 11 is a plan view showing one surface of a second membrane electrode assembly of the power generation unit.

As illustrated in FIG. 11, on a surface of the second resin frame member 82 on the anode electrode 78 side, an inlet buffer portion 90a is disposed between the fuel gas inlet manifold 24a and the second fuel gas channel 58. An outlet buffer portion 90b is disposed between the fuel gas outlet manifold 24b and the second fuel gas channel 58.

When two power generation units 12 are stacked each other, the coolant channel 38 is formed between the first metal separator 14 of one of the power generation units 12 and the third metal separator 20 of the other power generation unit 12.

As illustrated in FIG. 1, the second metal separators 18 are disposed at ends of the stacked body 13 in the stacking direction. Terminal portions 106a and 106b are respectively disposed at substantially the centers of the terminal plates 100a and 100b, which are disposed adjacent to the second metal separators 18 at the ends in the stacking direction. The terminal portions 106a and 106b extend outward in the stacking direction. The terminal portions 106a and 106b are respectively inserted into cylindrical insulators 108 so as to protrude to the outside of the end plates 104a and 104b. The insulators 102a and 102b are each made of an insulating material, such as a polycarbonate (PC) or a phenol resin.

The insulators 102a and 102b respectively include rectangular recessed portions 110a and 110b in middle portions thereof. Holes 112a and 112b are formed at substantially the centers of the recessed portions 110a and 110b. The terminal plates 100a and 100b are disposed in the recessed portions 110a and 110b. The terminal portions 106a and 106b of the terminal plates 100a and 100b are respectively inserted into the holes 112a and 112b with the cylindrical insulators 108 therebetween.

Holes 114a and 114b are respectively formed at substantially the centers of the end plates 104a and 104b so as to be coaxial with the holes 112a and 112b. In the end plate 104a, the oxidant gas inlet manifold 22a, the fuel gas inlet manifold 24a, the pair of coolant inlet manifolds 25a, the oxidant gas outlet manifold 22b, the fuel gas outlet manifold 24b, and the pair of coolant outlet manifolds 25b are formed.

Figure 12:
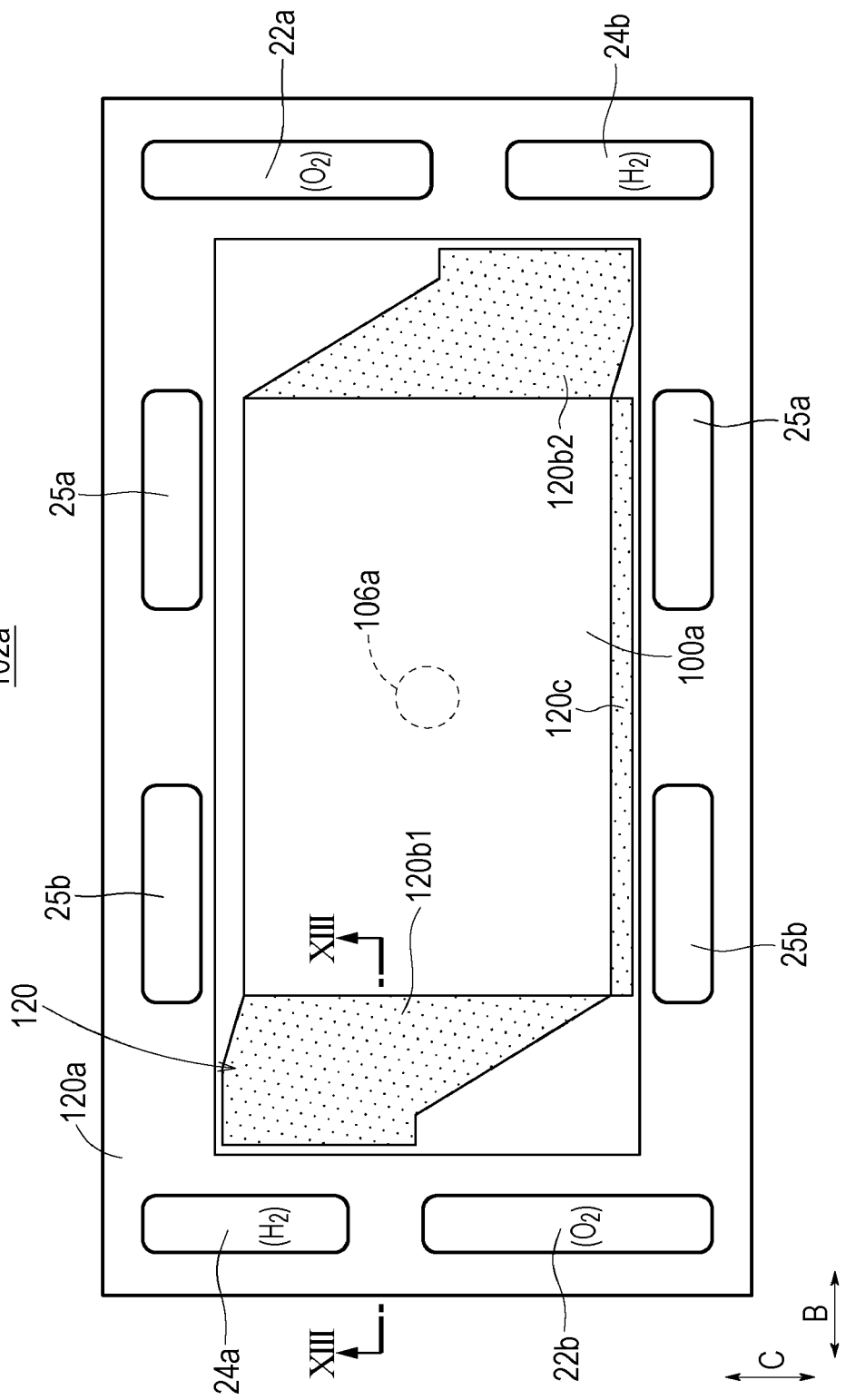
FIG. 12 is a plan view of one of a pair of insulators of the fuel cell stack.
Figure 13:
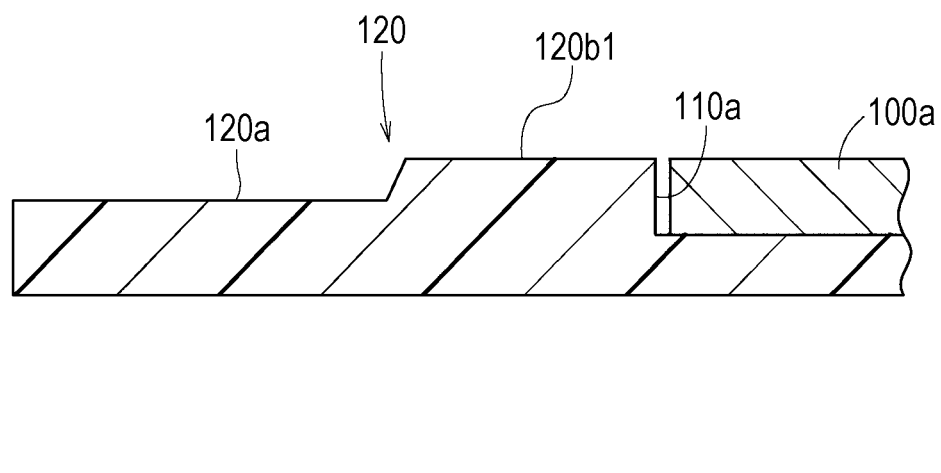
FIG. 13 is a sectional view of the insulator taken along line XIII-XIII of FIG. 12.

As illustrated in FIG. 12, a protrusion and recess portion 120 is formed in an outer peripheral part of a surface of the insulator 102a that contacts the second metal separator 18. The protrusion and recess portion 120 has a shape corresponding to a protrusion and recess shape of the surface 18a of the second metal separator 18. The protrusion and recess portion 120 includes a recessed portion 120a. The recessed portion 120a has a flat bottom surface that contacts the first protruding sealing portion 70a, which is disposed on the surface 18a of the second metal separator 18 (see FIGS. 2, 12, and 13).

The recessed portion 120a, including a part that contacts the first protruding sealing portion 70a, is disposed along the outer periphery of the insulator 102a. The recessed portion 120a closely contacts the first protruding sealing portion 70a and supports (back-supports) the first protruding sealing portion 70a by receiving an appropriate sealing linear pressure and a stacking load.

The protrusion and recess portion 120 further includes protruding portions 120b1 and 120b2 corresponding to the inlet buffer portion 86a and the outlet buffer portion 86b, which are disposed between the second metal separator 18 and the first membrane electrode assembly 16a. The protruding portions 120b1 and 120b2 have flat upper surfaces. The protruding portion 120b1 has a shape corresponding to that of the inlet buffer portion 86a, and the protruding portion 120b2 has a shape corresponding to that of the outlet buffer portion 86b (the same applies hereinafter). The protruding portions 120b1 and 120b2 restrict movement of the inlet buffer portion 86a and the outlet buffer portion 86b without applying pressures to the buffer portions 86a and 86b. At least parts of the protruding portion 120b1 and 120b2 contact the buffer portions 86a and 86b. Note that the protrusions and the linear channels of the inlet buffer portion 86a and the outlet buffer portion 86b may be formed on the second metal separator 18. The same applies hereinafter.

The protrusion and recess portion 120 further includes a protruding portion 120c, which has a shape corresponding to those of the convex 46a and concave 46b of the first anode drain passage 44 (see FIGS. 2 and 12). The protruding portion 120c restricts movement of the convex 46a and concave 46b without applying pressures to the convex 46a and concave 46b. At least a part of the protruding portion 120c contacts the convex 46a and concave 46b. The protruding portion 120c may be disposed near a opposite side in the same manner (not shown).

Figure 14:
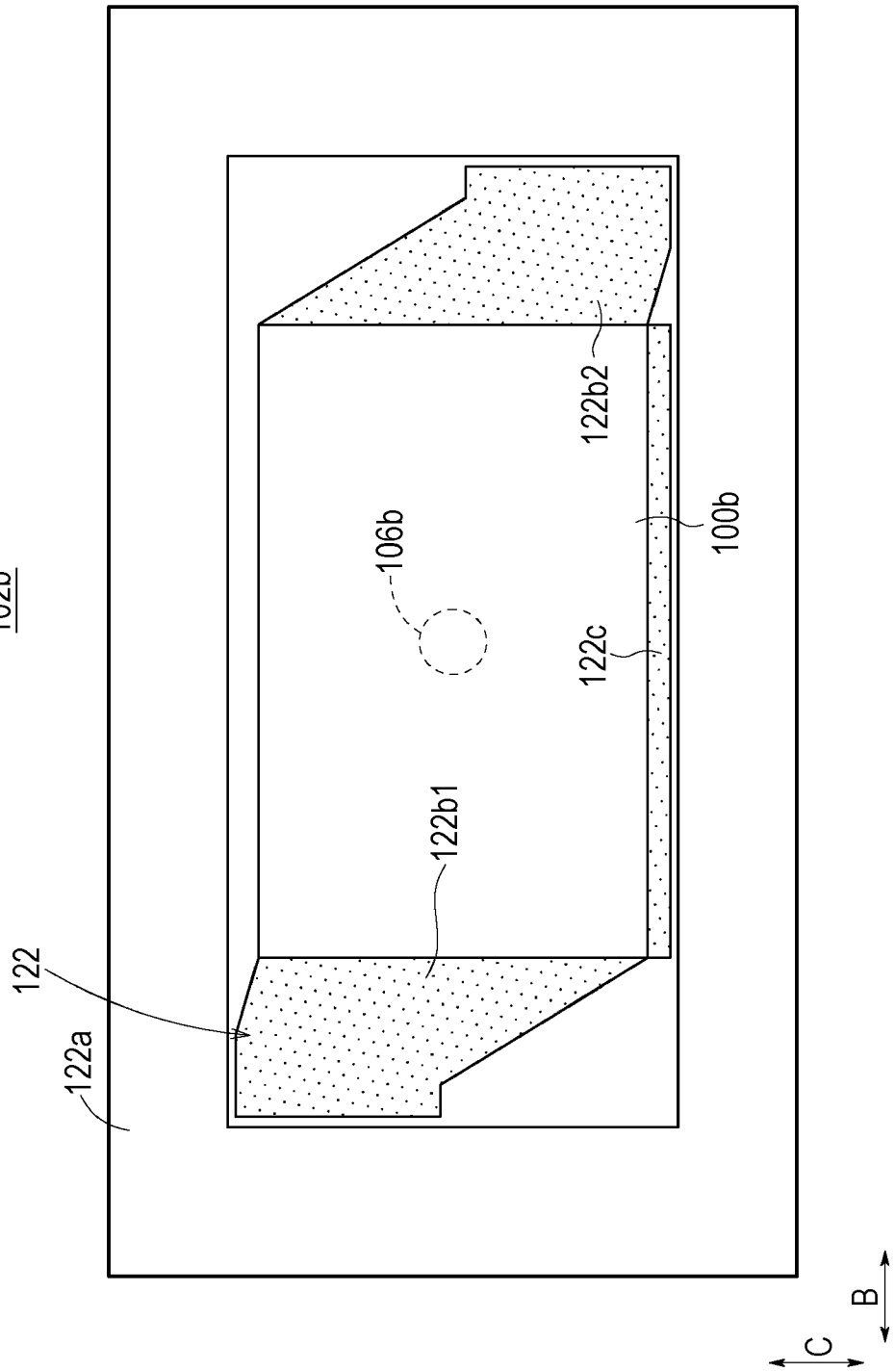
FIG. 14 is a plan view of the other of the pair of insulators of the fuel cell stack.

As illustrated in FIG. 14, a protrusion and recess portion 122 is formed in an outer peripheral part of a surface of the insulator 102b that contacts the second metal separator 18. The protrusion and recess portion 122 has a shape corresponding to a protrusion and recess shape of the surface 18b of the second metal separator 18. The protrusion and recess portion 122 includes a recessed portion 122a. The recessed portion 122a has a flat bottom surface that contacts the second protruding sealing portion 70b, which is disposed on the surface 18b of the second metal separator 18.

The recessed portion 122a, including a part that contacts the second protruding sealing portion 70b, is disposed along the outer periphery of the insulator 102b. The recessed portion 122a closely contacts the second protruding sealing portion 70b and receives an appropriate sealing linear pressure and a stacking load.

The protrusion and recess portion 122 further includes protruding portions 122b1 and 122b2 corresponding to the inlet buffer portion 88a and the outlet buffer portion 88b, which are disposed between the second metal separator 18 and the second membrane electrode assembly 16b. The protruding portions 122b1 and 122b2 have flat upper surfaces. The protruding portion 122b1 has a shape corresponding to that of the inlet buffer portion 88a, and the protruding portion 122b2 has a shape corresponding to that of the outlet buffer portion 88b. The protruding portion 122b1 and 122b2 restrict movement of the inlet buffer portion 88a and the outlet buffer portion 88b without applying pressures to the buffer portions 88a and 88b. At least parts of the protruding portion 122b1 and 122b2 contact the buffer portions 88a and 88b.

The protrusion and recess portion 122 further includes a protruding portion 122c, which has a shape corresponding to those of the convex 46a and concave 46b of the second cathode drain passage 54 (see FIGS. 2 and 14). The protruding portion 122c restricts movement of the convex 46a and concave 46b without applying pressures to the convex 46a and concave 46b. At least a part of the protruding portion 122c contacts the convex 46a and concave 46b. The protruding portion 122c may be disposed near a opposite side in the same manner (not shown).

The operation of the fuel cell stack 10 will be described below.

First, as illustrated in FIG. 1, an oxidant gas, such as an oxygen-containing gas, is supplied to the oxidant gas inlet manifold 22a through the end plate 104a. A fuel gas, such as a hydrogen-containing gas, is supplied to the fuel gas inlet manifold 24a through the end plate 104a. A coolant, such as pure water, ethylene glycol, an oil, or the like, is supplied to the pair of coolant inlet manifolds 25a.

Figure 5:
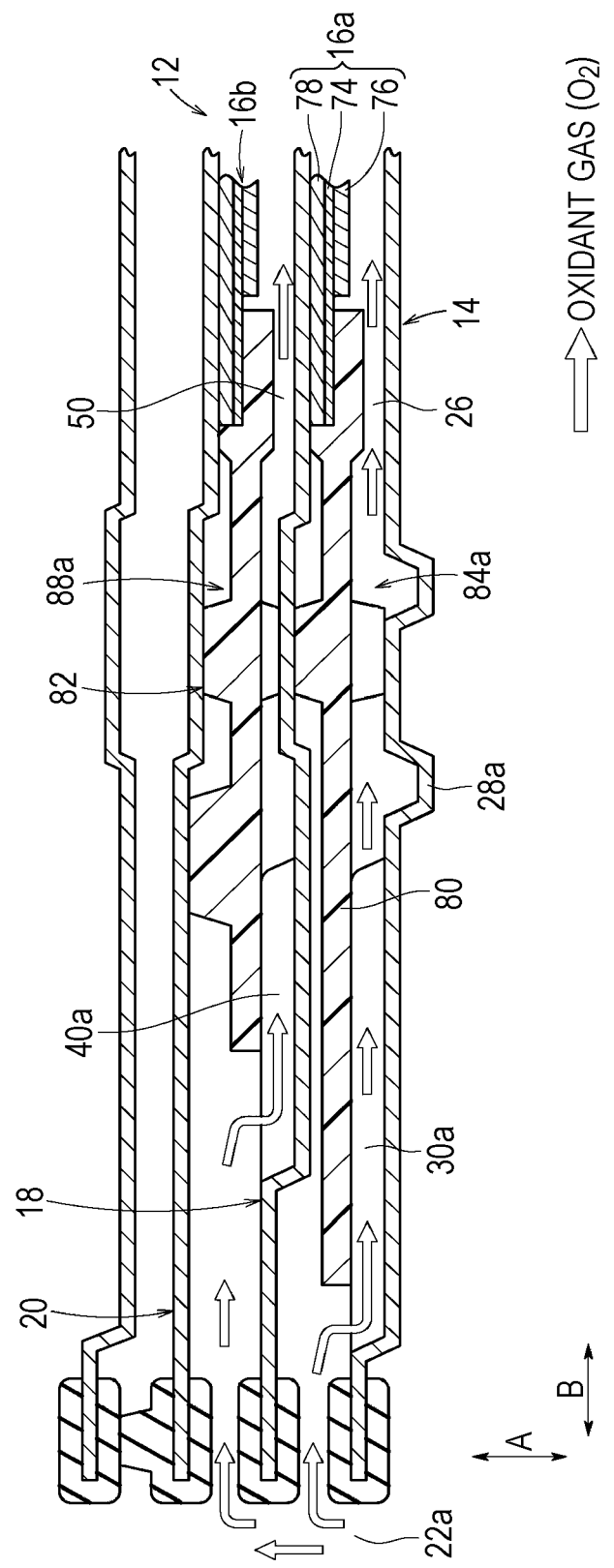
FIG. 5 is a sectional view of the power generation unit taken along line V-V of FIG. 3.

As illustrated in FIGS. 3 and 5, the oxidant gas flows from the oxidant gas inlet manifold 22a, through the inlet buffer portion 84a, and to the first oxidant gas channel 26 of the first metal separator 14. Moreover, the oxidant gas also flows from the oxidant gas inlet manifold 22a, through the inlet buffer portion 88a, and to the second oxidant gas channel 50 of the second metal separator 18.

The oxidant gas moves along the first oxidant gas channel 26 in the direction of arrow B (horizontal direction), and is supplied to the cathode electrode 76 of the first membrane electrode assembly 16a. Moreover, the oxidant gas moves along the second oxidant gas channel 50 in the direction of arrow B, and is supplied to the cathode electrode 76 of the second membrane electrode assembly 16b.

As illustrated in FIGS. 3 and 4, the fuel gas is supplied from the fuel gas inlet manifold 24a, through the supply holes 42a, and to the inlet buffer portion 86a. The fuel gas flows through the inlet buffer portion 86a, and is supplied to the first fuel gas channel 40 of the second metal separator 18. Moreover, the fuel gas flows from the fuel gas inlet manifold 24a and through the supply holes 60a, and is supplied to the inlet buffer portion 90a. The fuel gas flows through the inlet buffer portion 90a, and is supplied to the second fuel gas channel 58 of the third metal separator 20.

The fuel gas flows along the first fuel gas channel 40 in the direction of arrow B, and is supplied to the anode electrode 78 of the first membrane electrode assembly 16a. Moreover, the fuel gas flows along the second fuel gas channel 58 in the direction of arrow B, and is supplied to the anode electrode 78 of the second membrane electrode assembly 16b.

Accordingly, in each of the first membrane electrode assembly 16a and the second membrane electrode assembly 16b, the oxidant gas supplied to the cathode electrode 76 and the fuel gas supplied to the anode electrode 78 are consumed in electrochemical reactions in the electrode catalyst layers, and thereby electric power is generated.

Next, the oxidant gas, which has been supplied to the cathode electrodes 76 of the first membrane electrode assembly 16a and the second membrane electrode assembly 16b and consumed, is discharged through the outlet buffer portions 84b and 88b to the oxidant gas outlet manifold 22b (see FIG. 3).

The fuel gas, which has been supplied to the anode electrodes 78 of the first membrane electrode assembly 16a and the second membrane electrode assembly 16b and consumed, flows through the outlet buffer portions 86b and 90b and the discharge holes 42b and 60b, and is discharged to the fuel gas outlet manifold 24b.

As illustrated in FIG. 3, the coolant supplied to the pair of coolant inlet manifolds 25a is supplied from the coolant inlet manifolds 25a to the coolant channel 38. The coolant temporarily flows inward in the direction of arrow C, then flows in the direction of arrow B, and cools the first membrane electrode assembly 16a and the second membrane electrode assembly 16b. Then, the coolant flows outward in the direction of arrow C, and is discharged to the pair of coolant outlet manifolds 25b.

As illustrated in FIGS. 2 and 6, the first cathode drain passage 32 is formed on the surface 14a of the first metal separator 14 at a lower end of the first oxidant gas channel 26 in the vertical direction. Generated water is drained from the first oxidant gas channel 26 through the first cathode drain passage 32 vertically downward (in the direction of gravity). Therefore, generated water that has moved to a lower end portion of the first oxidant gas channel 26 flows through the first cathode drain passage 32 to the drain channel 36. Then, the water flows along the drain channel 36 in the direction of arrow B, and is discharged to the oxidant gas outlet manifold 22b. The same applies to the second cathode drain passage 54.

As illustrated in FIGS. 2 and 8, the first anode drain passage 44 is formed on the surface 18a of the second metal separator 18 at a lower end of the first fuel gas channel 40 in the vertical direction. Generated water is drained from the first fuel gas channel 40 through the first anode drain passage 44 vertically downward (in the direction of gravity). Accordingly, generated water that has moved to a lower end portion of the first fuel gas channel 40 flows through the first anode drain passage 44 to the drain channel 48. Then, the water flows along the drain channel 48 in the direction of arrow B, and is discharged to the fuel gas outlet manifold 24b. The same applies to the second anode drain passage 62.

In the first embodiment, as illustrated in FIG. 12, the protrusion and recess portion 120 is formed in an outer peripheral part of a surface of the insulator 102a that contacts the second metal separator 18. The protrusion and recess portion 120 has a shape corresponding to a protrusion and recess shape of the surface 18a of the second metal separator 18. To be specific, the protrusion and recess portion 120 includes the recessed portion 120a that contacts the first protruding sealing portion 70a, the protruding portions 120b1 and 120b2 that correspond to the inlet buffer portion 86a and the outlet buffer portion 86b, and the protruding portion 120c that corresponds to the convex 46a and concave 46b of the first anode drain passage 44.

Accordingly, the insulator 102a includes a back-support portion for the second metal separator 18 (a portion that receives a sealing load), so that it is not necessary that the second metal separator 18 that contacts the insulator 102a have a special structure. Therefore, the second metal separator 18, which is the same as the second metal separator 18 of the power generation unit 12, can be used at a position adjacent to the insulator 102a. The insulator 102b has the same structure as the insulator 102a.

Thus, with the fuel cell stack 10, the second metal separators 18 can be used as separators disposed adjacent to the insulators 102a and 102b. Therefore, an advantage is obtained in that the entirety of the fuel cell stack 10 can have a simple and economical structure. Note that the convex and concave (34a, 34b, and others) and the buffer portions (the inlet buffer portion 84a and others) each have a function of restricting movement by contacting an object without receiving a load.

Figure 15:
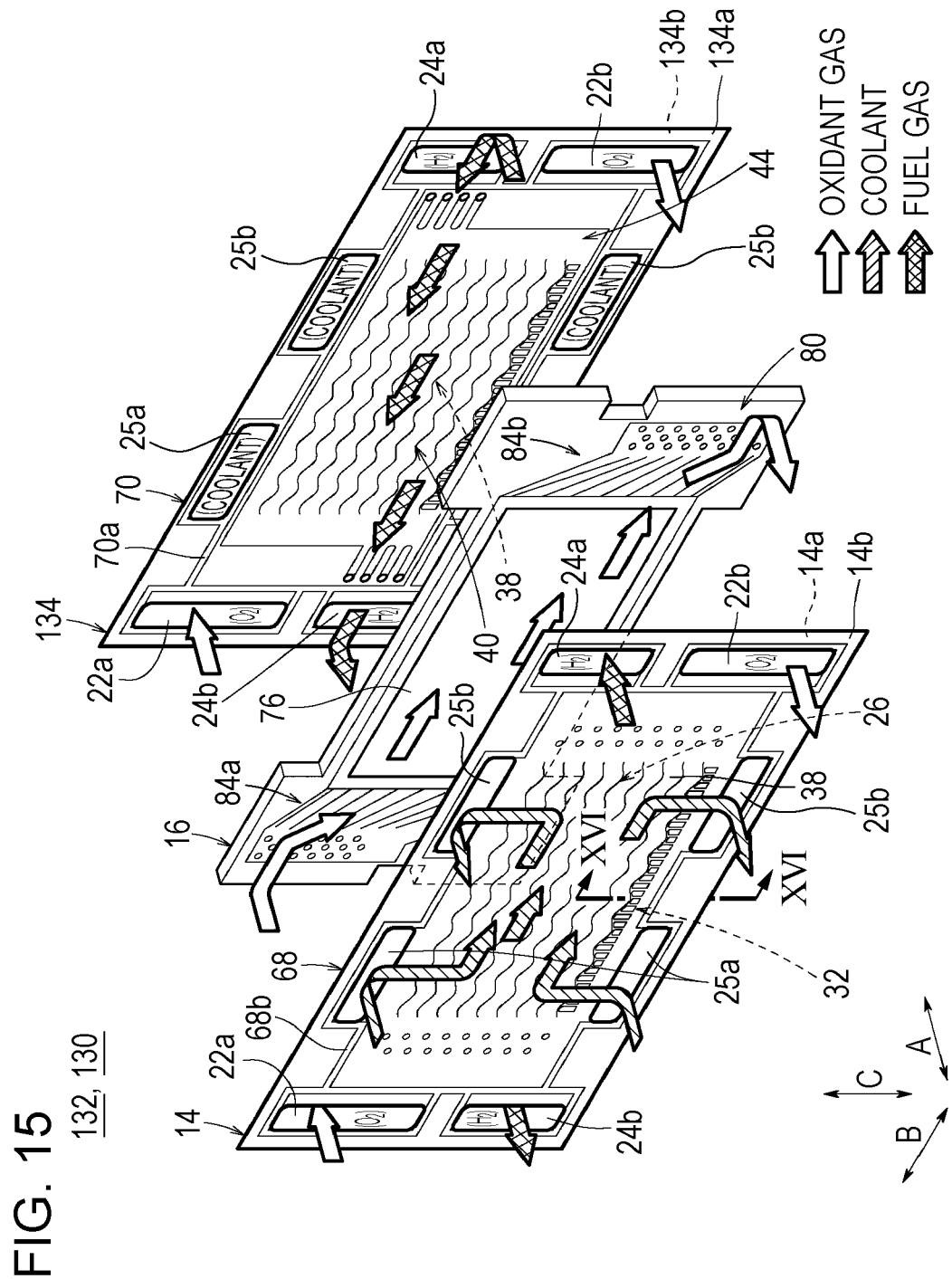
FIG. 15 is a partial exploded schematic perspective view of a fuel cell stack according to a second embodiment of the present disclosure.
Figure 16:
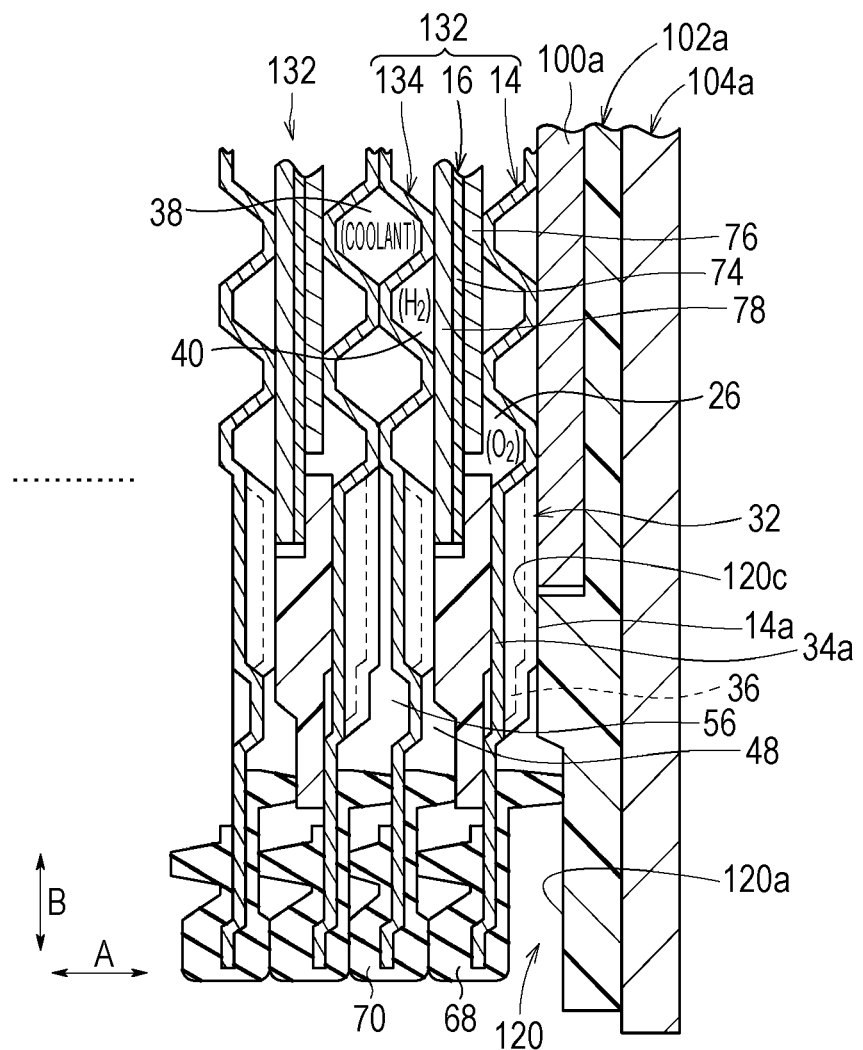
FIG. 16 is a sectional view of the power generation unit taken along line XVI-XVI of FIG. 15.

As illustrated in FIGS. 15 and 16, a fuel cell stack 130 according to a second embodiment of the present disclosure includes a plurality of power generation units 132 that are stacked. The power generation unit 132 has a cooling structure with which each cell is cooled, in contrast to the power generation unit 12, which has a skip cooling structure.

The power generation unit 132 includes a membrane electrode assembly 16 sandwiched between the first metal separator 14 and a second metal separator 134. The components the same as those of the power generation unit 12 according to the first embodiment will be denoted by the same numerals, and detailed description of such components will be omitted.

A fuel gas channel 40 is formed on a surface 134a of the second metal separator 134 facing the membrane electrode assembly 16. The first anode drain passage 44 is disposed at a lower end of the fuel gas channel 40 in the vertical direction. Generated water (back-diffusion water) is drained from the fuel gas channel 40 through the first anode drain passage 44 vertically downward (in the direction of gravity). A part of the coolant channel 38 is formed on a surface 134b of the second metal separator 134.

The membrane electrode assembly 16 has a structure the same as that of the first membrane electrode assembly 16a or the second membrane electrode assembly 16b in the first embodiment.

As illustrated in FIG. 16, the protrusion and recess portion 120 is disposed in an outer peripheral part of a surface of the insulator 102a that contacts the first metal separator 14. The protrusion and recess portion 120 has a shape corresponding to a protrusion and recess shape of the surface 14a of the first metal separator 14. A protrusion and recess portion (not shown) is disposed in an outer peripheral part of a surface of the insulator 102b that contacts the second metal separator 134. The protrusion and recess portion has a shape corresponding to a protrusion and recess shape of the surface 134b of the second metal separator 134.

In the second embodiment, the insulators 102a and 102b each include a back-support portion for the first metal separator 14 and the second metal separator 134. Therefore, it is not necessary to use a special structure. Thus, the fuel cell stack 130 has the same advantage as the first embodiment, in that the entirety of the fuel cell stack 130 can have a simple and economical structure.

According to an aspect of an embodiment of the present disclosure, a fuel cell stack includes a stacked body in which a membrane electrode assembly and a plurality of separators are stacked, the membrane electrode assembly including an electrolyte membrane and a pair of electrodes sandwiching the electrolyte membrane therebetween; and a terminal plate, an insulator, and an end plate that are disposed at each of two ends of the stacked body in a stacking direction.

In the fuel cell stack, the terminal plate has dimensions smaller than those of the insulator and is disposed in a recessed portion of the insulator. The insulator includes a protrusion and recess portion in an outer peripheral part thereof, the outer peripheral part being in contact with one of the separators that is disposed at an end of the stacked body, the protrusion and recess portion having a shape corresponding to a protrusion and recess shape of the separator.

It is preferable that a reactant gas manifold through which a reactant gas flows in the stacking direction be formed in each of the separators, the reactant gas being a fuel gas or an oxidant gas; a reactant gas channel and a buffer portion be formed between each of the separators and the membrane electrode assembly, the reactant gas channel allowing the reactant gas to flow therethrough in an in-plane direction of the separators, the buffer portion connecting the reactant gas channel and the reactant gas manifold to each other; and the protrusion and recess portion at least include a protruding portion that corresponds to the buffer portion.

It is preferable that convex and concave be formed at a lower end of the reactant gas channel, the convex and concave alternately protruding from a first surface and a second surface of the separator, the first surface being a surface on which the reactant gas channel is disposed, the second surface being on an opposite side to the first surface; and the protrusion and recess portion at least include a protruding portion that corresponds to the convex and concave.

It is preferable that each of the separators include a sealing member that suppresses leakage of a fluid that is at least one of a fuel gas, an oxidant gas, and a coolant, and the protrusion and recess portion at least include a recessed portion that contacts the sealing member.

With the aspect of an embodiment of the present disclosure, the insulator includes a protrusion and recess portion in an outer peripheral part thereof, the outer peripheral part being in contact with a separator that is disposed at an end of the stacked body. The protrusion and recess portion has a shape corresponding to a protrusion and recess shape of the separator. Accordingly, it is not necessary that the separator that is in contact with the insulator have a special structure because a back-support portion for the separator is formed in the insulator. Thus, a separator the same as that of a fuel cell can be used as the separator that is in contact with the insulator. Therefore, it is not necessary that the fuel cell stack include a special separator and therefore the fuel cell stack can have a simple and economical structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a stacked body comprising a plurality of separators and a membrane electrode assembly which are stacked in a stacking direction, the membrane electrode assembly including an electrolyte membrane and a pair of electrodes sandwiching the electrolyte membrane therebetween, the stacked body having a first end and a second end opposite to the first end in the stacking direction;
a first terminal plate, a first insulator, and a first end plate disposed at the first end of the stacked body;
a second terminal plate, a second insulator, and a second end plate disposed at the second end of the stacked body;
each of the first terminal plate and the second terminal plate being provided in a first recessed portion formed in each of the first insulator and the second insulator; and
each of the first insulator and the second insulator including an outer peripheral part and a protrusion and recess portion in the outer peripheral part which is in contact with each of the separators that is disposed at the first end and the second end of the stacked body, the protrusion and recess portion having a shape corresponding to a protrusion and recess shape of the separator,
wherein at least a recess portion of the protrusion and recess portion contacts a corresponding protruding portion of each of the separators disposed at the first end and the second end of the stacked body, or at least a protruding portion of the protrusion and recess portion contacts a corresponding recess portion of each of the separators disposed at the first end and the second end of the stacked body.

2. The fuel cell stack according to claim 1,
wherein a reactant gas manifold through which a reactant gas flows in the stacking direction is formed in each of the separators, the reactant gas being a fuel gas or an oxidant gas,
wherein a reactant gas channel and a buffer portion are formed between each of the separators and the membrane electrode assembly, the reactant gas channel allowing the reactant gas to flow therethrough in an in-plane direction of the separators, the buffer portion connecting the reactant gas channel and the reactant gas manifold to each other, and
wherein the protrusion and recess portion at least includes a first protruding portion that corresponds to the buffer portion.

3. The fuel cell stack according to claim 2,
wherein the first protruding portion has a flat upper surface and a shape corresponding to the buffer portion.

4. The fuel cell stack according to claim 1,
wherein each of the separators includes a sealing member that suppresses leakage of a fluid that is at least one of a fuel gas, an oxidant gas, and a coolant, and
wherein the protrusion and recess portion at least includes a second recessed portion that contacts the sealing member.

5. The fuel cell stack according to claim 4,
wherein the second recessed portion has a flat bottom surface.

6. The fuel cell stack according to claim 1, wherein the protrusion and recess portion includes a first protruding portion that corresponds to a buffer portion and a second recessed portion that surrounds the first protruding portion.

7. The fuel cell stack according to claim 1, wherein the protrusion and recess portion of the first insulator includes a second recessed portion that surrounds a reactant gas manifold formed in the first insulator.

8. The fuel cell stack according to claim 1, wherein the protrusion and recess portion at least includes a first protruding portion and a second protruding portion, the first protruding portion and the second protruding portion being aligned along an axial direction of the insulator.

9. The fuel cell stack according to claim 1,
wherein the plurality of separators includes at least three separators, the at least three separators including:
the separators disposed at the first end and the second end of the stacked body; and
a separator disposed within a power generation unit of the fuel cell stack.

10. A fuel cell stack comprising:
a stacked body comprising a plurality of separators and a membrane electrode assembly which are stacked in a stacking direction, the membrane electrode assembly including an electrolyte membrane and a pair of electrodes sandwiching the electrolyte membrane therebetween, the stacked body having an end in the stacking direction;
a terminal plate, an insulator, and an end plate disposed at the end of the stacked body;
the terminal plate being provided in a recessed portion formed in the insulator; and
the insulator including an outer peripheral part and a protrusion and recess portion in the outer peripheral part which is in contact with one of the separators that is disposed at the end of the stacked body, the protrusion and recess portion having a shape corresponding to a protrusion and recess shape of the one of the separators,
wherein at least a recess portion of the protrusion and recess portion contacts a corresponding protruding portion of the separator disposed at the end of the stacked body, or at least a protruding portion of the protrusion and recess portion contacts a corresponding recessed portion of the separator disposed at the end the stacked body.

11. The fuel cell stack according to claim 10, wherein the protrusion and recess portion includes a first protruding portion that corresponds to a buffer portion and a second recessed portion that surrounds the first protruding portion.

12. The fuel cell stack according to claim 10, wherein the protrusion and recess portion of the insulator includes a second recessed portion that surrounds a reactant gas manifold formed in the insulator.

13. A fuel cell stack comprising:
a stacked body comprising a plurality of separators and a membrane electrode assembly which are stacked in a stacking direction, the membrane electrode assembly including an electrolyte membrane and a pair of electrodes sandwiching the electrolyte membrane therebetween, the stacked body having a first end and a second end opposite to the first end in the stacking direction;
a first terminal plate, a first insulator, and a first end plate disposed at the first end of the stacked body;
a second terminal plate, a second insulator, and a second end plate disposed at the second end of the stacked body;

each of the first terminal plate and the second terminal plate being provided in a first recessed portion formed in each of the first insulator and the second insulator; and each of the first insulator and the second insulator including an outer peripheral part and a protrusion and recess portion in the outer peripheral part which is in contact with each of the separators that is disposed at the first end and the second end of the stacked body, the protrusion and recess portion having a shape corresponding to a protrusion and recess shape of the separator, wherein a reactant gas manifold through which a reactant gas flows in the stacking direction is formed in each of the separators, the reactant gas being a fuel gas or an oxidant gas, wherein a reactant gas channel and a buffer portion are formed between each of the separators and the membrane electrode assembly, the reactant gas channel allowing the reactant gas to flow therethrough in an in-plane direction of the separators, the buffer portion connecting the reactant gas channel and the reactant gas manifold to each other, wherein the protrusion and recess portion at least includes a first protruding portion that corresponds to the buffer portion, wherein convex and concave are formed at a lower end of the reactant gas channel, the convex and concave alternately protruding from a first surface and a second surface of the separator, the first surface being a surface on which the reactant gas channel is disposed, the second surface being on an opposite side to the first surface, and wherein the protrusion and recess portion at least includes a second protruding portion that corresponds to the convex and concave.

* * * * *